Patented Nov. 18, 1941

2,263,379

UNITED STATES PATENT OFFICE 2,263,379

PROCESS FOR THE PRODUCTION OF METHYL VINYL KETONE

Albert S. Carter and Frank Willard Johnson, Wilmington, Del., assignors to E. I. du Pont de Nemours & Company, Wilmington, Del., a corporation of Delaware No Drawing. Application August 11, 1939, Serial No. 289,584

7 Claims. (Cl. 260—593)

This invention relates to a process of preparing methyl vinyl ketone and to improvements in isolating the same.

Methyl vinyl ketone is a known compound and has been prepared:

By boiling methyl-$\beta$-chlorethyl ketone with diethyl aniline, (Blaise and Maire, Bull. Soc. Chim. (4), 3, 265–86, 413–27, 543–51 and 658–74 (1908) and Compt. rend. 142, 215–17, (1906), and 145, 73–75 (1907)), By dehydrating $\beta$-acetyl ethyl alcohol, (Bayer and Co., U. S. P. 989,993 (1911), D. R. P. 222,551 (1908), Fr. P. 409,403 (1909)), By condensing ethylene with acetyl chloride in presence of aluminum chloride, (Krapiwin, Bull. Soc. Imp. Moscow, 1908, 1, Chem. Abs. 5, 1281 (1911)), By heating $\beta$-acetyl acrylic acid, (Bayer and Co., D. R. P. 242,612 (1910)), By oxidation of methyl vinyl carbinol, (Delaby, Compt. rend., 175, 967–70 (1922), 182, 140–42 (1926), and Bull. Soc. Chim. (4), 33, 602–26 (1923)), By distilling 1-butanol-3-one with traces of iodine, (Decombe, Compt. rend. 202, 1685–7 (1936)), And by hydration of monovinyl-acetylene in presence of inorganic acids and mercury salts, (Carter to Du Pont Co., U. S. P. 1,896,161 (1933), Conaway to Du Pont., U. S. P. 1,967,225 (1934)).

Recently Tishchenko, (J. Gen. Chem. (U. S. S. R.) 7, 658–62 (1937), Chem. Abs. 31, 5754 (1937)), has observed that when 2,4-dichlor-2-butene is hydrolyzed in presence of calcium carbonate "2 per cent of methyl vinyl ketone is formed."

This invention has as an object the discovery of a method of preparing methyl vinyl ketone. A further object is the conversion of 2,4-dichlor-2-butene, a cheap by-product material, into the commercially valuable methyl vinyl ketone. Another object is an improved method of isolating methyl vinyl ketone from aqueous solutions. Other objects will appear hereinafter.

The first object is accomplished by shaking or stirring 2,4-dichlor-2-butene with an aqueous solution or suspension of cuprous chloride, preferably at an elevated temperature, by which the following reaction occurs:

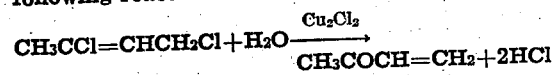

In order that the invention may be more fully understood, the following examples are set forth by way of illustration, but the invention is not limited thereto as will become more fully apparent hereinafter. Wherever the term "parts" are used, it is intended to signify "parts by weight."

Example I

A mixture containing 25 parts of cuprous chloride, 95 parts of 37 per cent hydrochloric acid, 124 parts of water and 1 part of precipitated copper was agitated under nitrogen at 60° C. until all cupric copper present as an impurity in the cuprous chloride was reduced as shown by formation of a nearly colorless solution. To this catalyst was added 35 parts of 2,4-dichlor-2-butene and the mixture was well agitated for 4.5 hours at 60° C. The product was cooled to 15° C., and the pH was adjusted to about 4–6 by slow addition of 20 per cent potassium hydroxide solution under good agitation. The mixture was then distilled and the distillate collected until it did not contain significant amounts of methyl vinyl ketone. This may be determined by neutralizing a small sample of distillate and saturating with potassium carbonate. When a supernatant layer was no longer formed in this test, the distillation was discontinued. The distillate was carefully neutralized with potassium hydroxide solution and saturated with potassium carbonate. The supernatant layer was separated, a small amount of hydroquinone was added and it was quickly dried with fused calcium chloride and then fractionally distilled. The fraction boiling between 51–56° C., at 300 mm. of mercury pressure was found to contain only a trace of chlorine, and to have a refractive index at 20° C. of 1.409. It was further identified as methyl vinyl ketone by formation of 3-methyl-1-phenyl pyrazoline with phenyl hydrazine, which melted at 76° C.

It is not necessary to add potassium hydroxide to the catalyst before the distillation and where the catalyst is to be re-used it is advantageous to carry out the distillation without such addition. In this case, it may be preferable to carry out the distillation under reduced pressure, (e. g., at 50–100 mm. of mercury) keeping the volume of the catalyst approximately constant by addition of water or steam. The acid distillate may then be neutralized before salting with potassium carbonate, or if a neutral salt such as sodium chloride, calcium chloride, sodium sulfate, or potassium chloride is used for the salting, it is not necessary to neutralize before salting. When one of these salts is used, a small further amount of methyl vinyl ketone may be obtained by distilling a portion of the salted solution after removing the supernatant layer of ketone, and resalting this distillate.

An economical and advantageous method of obtaining methyl vinyl ketone from its dilute aqueous solutions either obtained from the present process or any other such as, for example, U. S. Patents 1,896,161 and 1,967,225 is described in the following example which constitutes an important feature of the present invention alone as well as in combination with the hydrolysis of 2,4-dichlor-2-butene.

*Example II*

One hundred parts of an aqueous solution containing 30 parts of methyl vinyl ketone and a small amount of hydroquinone was distilled through a packed column equivalent to 11 theoretical plates and equipped with a total reflux head operated to return 6 to 7 parts to the column for each part taken off. After establishing equilibrium in the column, the product at the head of the column was found to have a boiling point between 75 and 76° C., at one atmosphere pressure. This fraction was collected until the boiling point reached 78° C. The distillate which was greatly enriched in ketone was saturated with potassium carbonate, the top layer removed and quickly dried over fused calcium chloride. The dried product was redistilled in a similar manner through a fractionating column and the fraction boiling between 43 and 45° C., at 200 mm. of mercury pressure was identified as methyl vinyl ketone.

The azeotrope obtained in the first fractionation described above contains 85-95 per cent of ketone and is itself valuable in many applications and may often be used without further drying or purification. The exact design of the fractionating equipment used is, of course, unimportant and the description given is merely by way of example; any of the many types of fractional distillation equipment well known in the art will serve to give a much enriched aqueous methyl vinyl ketone solution.

*Example III*

A mixture of 375 parts cuprous chloride, 1350 parts of water and 50 parts of precipitated copper was agitated under nitrogen and the pH of the mixture maintained at 4-6 by addition of hydrochloric acid until all of the copper chloride was in the cuprous condition. 450 parts of 2,4-dichlor-2-butene were then added and the mixture well agitated at 70° C., for 5 hours. The product was then distilled by maintaining it at 70° and reducing the pressure until 1500 parts of distillate had been collected. This distillate was neutralized by addition of 20 per cent potassium hydroxide solution and then saturated with potassium carbonate. The supernatant layer of ketone was separated, dried and fractionated as described in the first example.

*Example IV*

A mixture of 64 parts of cuprous chloride, 72 parts potassium chloride, 205 parts water and 6 parts precipitated copper was agitated under nitrogen until the copper chloride was all in the reduced state, the solution being maintained slightly acid to m-cresol purple by small additions of hydrochloric acid as needed. 34.5 parts of 2,4-dichlor-2-butene were then added and the mixture well agitated at 60° C. for 4.5 hours. The product was steam distilled until the condensate no longer contained a significant amount of ketone.

This total distillate may be neutralized with an alkali such as sodium hydroxide and used as it is in many applications where dilute solutions are suitable; or the methyl vinyl ketone may be separated by one of the methods heretofore described.

Although it is usually preferable to start with 2,4-dichlor-2-butene, it is also possible to obtain methyl vinyl ketone by treating 2-chloro-2-butene-4-ol, a primary hydrolysis product of the dichlorobutene, in the manner described in the examples.

The amount of cuprous chloride in the reaction mixture may be varied within very wide limits, although it is usually preferred to use 5 to 20 per cent. To prevent oxidation of the cuprous salts, it is generally advisable to operate under an inert atmosphere such as nitrogen, carbon dioxide or hydrogen. Other salts, such as ammonium chloride, potassium chloride, sodium chloride, or lithium chloride may be added to increase the solubility of the cuprous chloride, or a moderate excess of hydrochloric acid may be present in the catalyst for this purpose. It is preferable to avoid a large excess of hydrochloric acid because this tends to inhibit the formation of methyl vinyl ketone. The hydrochloric acid formed in the catalyst during the reaction may be neutralized by continuous addition of an alkaline solution or a solid acid acceptor during the reaction.

The salting out of the methyl vinyl ketone from distillates comprising ketone and water may be accomplished by the use of any inert, water-soluble salt as, for example, calcium chloride, sodium chloride, potassium carbonate, sodium carbonate, sodium sulfate, etc. Potassium carbonate is preferred.

When the methyl vinyl ketone is distilled from the reaction mass by simple distillation as described in Example I, the distillate has a high water content. Accordingly, the salting out of the ketone requires large amounts of potassium carbonate or other salts. The use of steam distillation, as in Examples I and IV, increases still further the proportion of water in the distillate with the accompanying disadvantages of increase in amount of salt necessary for salting out methyl vinyl ketone.

According to one feature of the present invention, these disadvantages have been overcome by enriching the methyl vinyl ketone as described in Example II. Distillates having a low water content can be saturated by a relatively low amount of salt, and, therefore, the separation of methyl vinyl ketone is carried out easily and economically. Accordingly, the fractional distillation of mixtures of methyl vinyl ketone and water, containing large amounts of water, to obtain the azeotrope represents an important advance in the art.

While distillation processes for the separation of methyl vinyl ketone have been specifically described, other methods may be used. For example, the methyl vinyl ketone can be separated from the catalytic mixture by extraction with solvents such as ether, benzene, chloroform, carbon tetrachloride, ethyl acetate, etc. By adding a neutral or acid salt such as sodium sulfate or sodium acid sulfate to the catalytic mixture, the methyl vinyl ketone can be continuously decanted.

As has been above noted, slight amounts of methyl vinyl ketone have been obtained by hydrolyzing 2,4-dichlor-2-butene in the presence of calcium carbonate. However, the latter does not appear to catalyze the reaction, but merely to act as an acid acceptor. In view of the teaching of Tishchenko that only about 2 per cent of product was obtained, it is very surprising that with the presence of cuprous chloride in the reaction mixture 2,4-dichlor-2-butene is converted in good yield to methyl vinyl ketone.

While the process has been described as a batch operation, it may also be carried out as a continuous process. It is possible to continuously remove the ketone and acid from the catalyst by distillation into a separating chamber from which the 2,4-dichlor-2-butene which steam distills at the same time is continuously returned to the catalyst. The aqueous layer may then be salted with or without prior neutralization or it may first be enriched in ketone by fractionation, followed by salting and drying. The dried ketone may then be fractionally distilled either at atmospheric pressure or preferably at reduced pressure.

The herein described invention supplies an improved method of producing methyl vinyl ketone in good yield. This compound readily polymerizes to give a resin which is useful in many ways, as, for example, in making safety glass and other laminated glass articles. Methyl vinyl ketone reacts with amines to produce valuable heterocyclic compounds. It is, moreover, an intermediate in the production of pharmaceuticals. The invention also teaches a method of obtaining an azeotropic mixture of methyl vinyl ketone and water, which mixture is useful, either as an intermediate in the preparation of water-free methyl vinyl ketone or directly as a suitable source of methyl vinyl ketone for reactions involving the same.

It is apparent that many widely different embodiments of this invention may be made without departing from the spirit and scope thereof, and, therefore, it is not intended to be limited except as indicated in the appended claims.

We claim:

1. A process which comprises reacting a compound of the formula $CH_3-CCl=CH-CH_2X$, wherein X is a member of the group consisting of Cl and OH, with water in the presence of cuprous chloride to produce methyl vinyl ketone.

2. A process for the production of methyl vinyl ketone which comprises reacting a compound of the formula $CH_3-CCl=CH-CH_2X$, wherein X is a member of the group consisting of Cl and OH, with water in the presence of cuprous chloride in an inert atmosphere, and isolating the methyl vinyl ketone.

3. A process for the production of methyl vinyl ketone which comprises reacting 2,4-dichlor-2-butene with water in the presence of cuprous chloride, fractionally distilling the resulting mixture and collecting an azeotropic mixture of methyl vinyl ketone and water.

4. A process for the production of methyl vinyl ketone which comprises reacting 2,4-dichlor-2-butene with water in the presence of cuprous chloride, separating methyl vinyl ketone from the reaction mixture by distillation, saturating the aqueous distillate with an inert, water-soluble salt, thereby separating methyl vinyl ketone.

5. A process for the production of methyl vinyl ketone which comprises reacting 2,4-dichlor-2-butene with water in the presence of cuprous chloride, isolating from the reaction mixture an azeotropic mixture of methyl vinyl ketone and water by fractional distillation, saturating the azeotropic mixture with potassium carbonate, drying the ketone layer thus formed, and fractionally distilling it to produce water-free methyl vinyl ketone.

6. A process which comprises fractionally distilling an aqueous solution of methyl vinyl ketone and collecting an azeotropic mixture of methyl vinyl ketone and water and saturating the azeotropic mixture with an inert, water-soluble salt to produce methyl vinyl ketone.

7. A process which comprises fractionally distilling an aqueous solution of methyl vinyl ketone and collecting an azeotropic mixture of methyl vinyl ketone and water, saturating the azeotropic mixture with potassium carbonate, drying the ketone layer thus formed, and fractionally distilling it to produce water-free methyl vinyl ketone.

ALBERT S. CARTER.
F. WILLARD JOHNSON.